United States Patent [19]

Bitetti

[11] Patent Number: 4,818,926

[45] Date of Patent: Apr. 4, 1989

[54] TACHOMETRIC DEVICE DRIVEN BY AN ELECTRIC MOTOR

[75] Inventor: Rodolfo Bitetti, Milan, Italy

[73] Assignee: Veglia Borletti S.r.l., Milan, Italy

[21] Appl. No.: 101,071

[22] Filed: Sep. 25, 1987

[30] Foreign Application Priority Data

Oct. 3, 1986 [IT] Italy .................. 53908/86[U]

[51] Int. Cl.⁴ .............................................. G01P 3/487
[52] U.S. Cl. ..................................... 318/618; 73/519; 324/163; 324/167
[58] Field of Search ................ 318/326, 327, 618; 307/10 R; 320/64; 328/144; 310/156, 171; 324/163, 164, 166, 167, 174, 179, 160, 161; 73/2, 518, 519

[56] References Cited

U.S. PATENT DOCUMENTS

| | | | |
|---|---|---|---|
| 3,739,211 | 6/1973 | Hasler | 310/171 X |
| 4,241,607 | 12/1980 | Maggia | 73/519 X |
| 4,371,834 | 2/1983 | Bezard et al. | 324/164 X |
| 4,376,308 | 3/1983 | McNair | 328/144 X |
| 4,435,677 | 3/1984 | Thomas | 328/144 X |
| 4,572,999 | 2/1986 | Coulon | 318/618 |

FOREIGN PATENT DOCUMENTS 2079473 1/1982 United Kingdom ................ 73/519

*Primary Examiner*—Bentsu Ro
*Attorney, Agent, or Firm*—Albert L. Jeffers; David L. Ahlersmeyer

[57] ABSTRACT

A tachometric device is provided with a D.C. electric motor a shaft of which drives a pair of permanent magnets to rotate. A first permanent magnet controls a speed indicator unit; a second permanent magnet is rotatably mounted within a winding the terminals of which are connected to a negative feed back circuit for controlling the speed of the motor.

5 Claims, 1 Drawing Sheet

TACHOMETRIC DEVICE DRIVEN BY AN ELECTRIC MOTOR

BACKGROUND OF THE INVENTION

The present invention relates to a tachometric device driven by an electric motor.

In more detail, the present invention relates to a tachometric device of the type provided with an electric motor, a shaft of which controls a speed indicator unit by means of a permanent magnet connected to it; this device being likewise provided with a magneto-electric transducer cooperating with the said magnet for the purpose of generating an electric signal usable as negative feedback to control the speed of rotation of the motor shaft.

In known devices of the type specified above the magneto-electric transducer is, in general, constituted by a magnetically actuatable electric switch, a Hall-effect probe, etc. This involves various disadvantages, especially during assembly, during the course of which it is necessary, in particular, correctly to position the transducer with respect to the magnet for the purpose of obtaining, in use, a correct value of the electric feedback signal.

SUMMARY OF THE INVENTION

The purpose of the present invention is that of providing a tachometric device which will be able to overcome the disadvantages connected with devices of the known type, described above.

The object is achieved by the present invention in that it relates to a tachometric device of the type comprising:

a first electric signal generator dependent on the speed of rotation of the first shaft;

an electric motor provided with an associated shaft;

a magnetically controllable speed indicator unit;

a first magnet mounted for rotation with the shaft of the motor and magnetically cooperating with the speed indicator unit;

a second electrical signal generator generating signals dependent on the speed of rotation of the shaft of the motor; and a processor circuit having first and second inputs connected to the output of the first signal generator and the second signal generator respectively; the device being characterised by the fact that the second signal generator comprises:

a second permanent magnet mounted for rotation with the shaft of the motor;

an electric winding rigidly connected to the body of the said motor in a position substantially facing the second permanent magnet and operable, in use, as a source of current induced by the effect of the rotation of the second magnet.

BRIEF DESCRIPTION OF THE DRAWINGS

For a better understanding of the present invention a preferred embodiment is described hereinbelow by way of non-limitative example and with reference to the attached drawing, in which.

DETAILED DESCRIPTION OF THE INVENTITON

Figure 1:
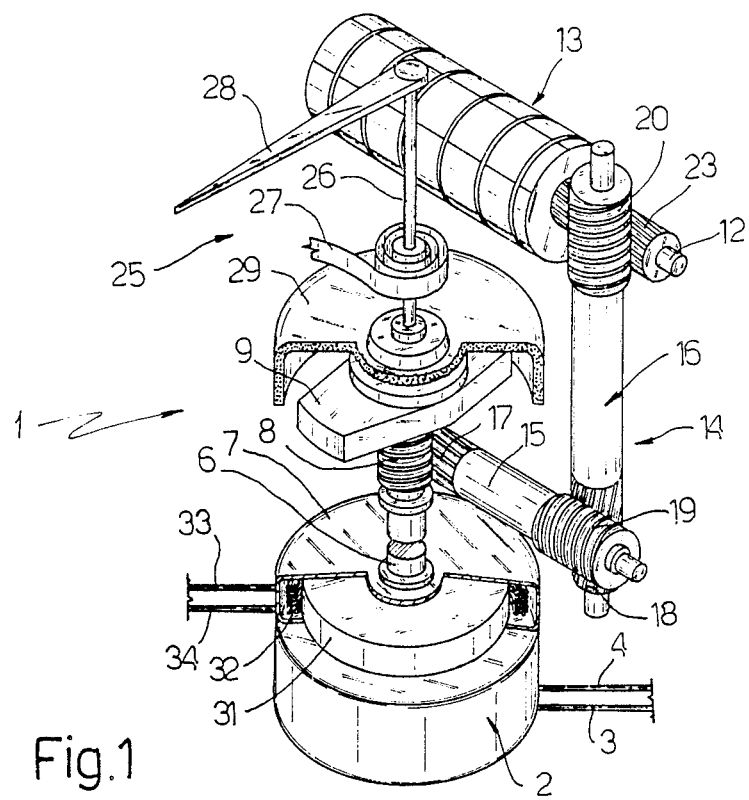
FIG. 1 is a partially sectioned perspective view of a mechanical part of a tachometric device formed according to the principles of the present invention.

With particular reference to FIG. 1, a tachomemtric device, generally indicated with the reference numeral 1, is provided with an electric motor 2, preferably of D.C. type, electrically supplied via cables 3,4.

The motor 2 is provided with a drive shaft 6, extending out from a casing 7 and supporting, respectively, a worm screw 8 and a magnet 9 having two opposite poles.

The motor shaft 6 is torsionally coupled to a shaft 12 of a drum type odometer unit 13 by means of a kinematic drive transmission chain 14. This latter comprises, in particular, shafts 15 and 16 disposed at 90° to one another and having, respectively, at opposite ends, helically cut toothed wheels 17 and 18 and worm screws 19 and 20. The transmission of drive from the shaft 6 to the shaft 12 takes place therefore through the worm screw 8, the helical gear wheel 17 and the worm screw of the shaft 15, the helical gear wheel 18 and the worm screw 20 of the shaft 16, and a helical tooth gear wheel 23 of the shaft 12 coupled to the worm screw 20.

The permanent magnet 9 controls a speed indicator unit generally indicated 25 and substantially constituted by a movable element which provides, in a known way, an indication of the speed of rotation of the drive shaft 6. In more detail, the unit 25 comprises a shaft 26 rotatable about its axis against the resilient action exerted by an opposing spring 27, as well as an index 28 and a bell element 29 respectively connected to opposite ends of the shaft 26 itself.

According to the present invention the shaft 6 of the motor 2 drives a permanent magnet 31 to rotate which is surrounded by an electric winding 32 fixedly supported by the casing 7 of the motor 2. In more detail, the magnet 31 has a disc-like structure with, conveniently, four magnet poles lying substantially in a plane perpendicular to the axis of the drive shaft 6; the winding 32 is provided with a plurality of circular turns lying in the same plane as the magnetic poles in such a way as to surround the magnet 31 peripherally, and has two terminals 33 and 34 which project out from the casing 7.

Figure 2:
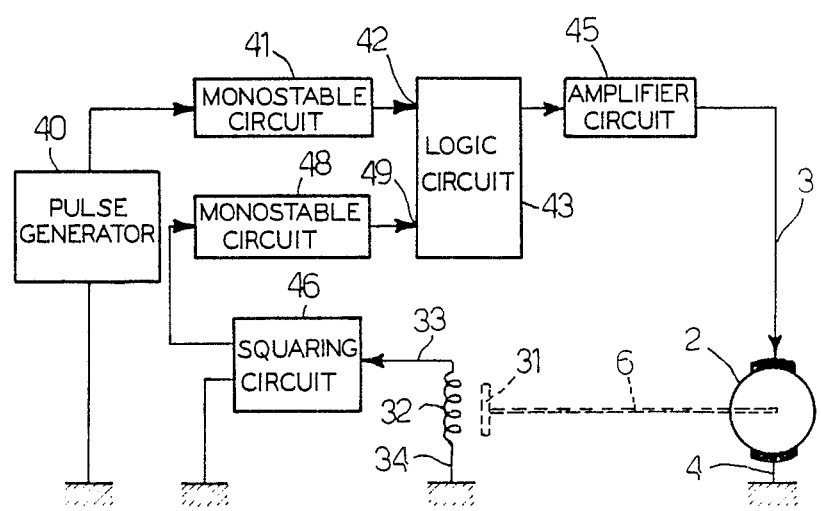
FIG. 2 is a block schematic diagram of an electronic part of the device.

With particular reference to FIG. 2, a pulse generator 40 has a terminal connected to ground and a further output at which pulses appear with a frequency dependent on the speed of rotation of a shaft (not illustrated), which is connected, via a monostable multi-vibrator 41 to a set input 42 of a logic circuit 43 preferably formed as a bistable multivibrator.

An output of the circuit 43, at which there is present a signal at the logic level "1" after each instant in which a signal is received at the input 42, is connected, via an amplifier 45, to the lead 3 of the motor 2, the lead 4 of which is connected to ground.

The motor 2, through the magnet 31, causes induction of an electric signal in the winding 32, the terminals 33, 34 of which are respectively connected to the input of a squaring circuit 46 and to ground. The squaring circuit 46 has an output, connected via a monostable circuit 48, to a zeroing input 49 (reset) of the logic circuit 43. In particular, the presence of a signal at this input causes the output of the logic circuit 43 itself to return to a logic "0" level, if this output is at logic level "1".

The operation of the device 1 takesplace as follows. First of all, supposing that the shaft, the angular speed of which is to be measured, is stationary so that the pulse generator 40 associated with it emits no signal at its output. Consequently, the output of the circuit 43 is at logic level "0" and therefore the motor 2 is not supplied and remains stationary, and likewise, the odometer unit 13 and the index 28 of the indicator unit 25 are not activated.

Rotation of the shaft associated with the pulse generator 40 causes emission, by the output of this latter, of a train of pulses, the frequency of which is proportional to the speed of rotation of the shaft itself. These pulses, sent through the monostable circuit 41 to the input 42 of the logic circuit 43, force the output of this circuit to logic level "1" and consequently cause, through the amplifier 45, a supply of current to the motor 2. The shahft 6 of this latter starts to rotate and, through the permanent magnet 31, induces an alternating electric current in the winding 32. The squaring circuit 46 transforms this current into a square waveform signal which is transmitted to the monostable circuit 48 the output from which sends a pulse to the input 49 of the logic circuit 43 causing the output of the circuit 43 itself to return to the logic level "0" and consequently interrupting the supply to the motor 2.

The motor 2 would still perform a small rotation due to its inertia and then stop; since, however, the shaft associated with the pulse generator 40 is subjected an angular rotation, at the input 42 of the logic circuit 43 there arrives almost instantaneously, through the monostable circuit 41, a new enabling impulse following which the output of the logic circuit 43 returns to logic level "1", the electric motor 2 is again supplied and a cycle similar to that described above is therefore repeated. In particular, until the pulses received at the input 42 of the circuit 43 have a frequency greater than those received at the input 49 of the circuit 43 itself, during the course of a complete cycle between two successive activations of the motor 2, the ratio between the presence and absence of supply to the engine is considerably greater than one. In these conditions the motor 2 progressively increases in angular speed until reaching an equilibrium condition in which the supply voltage provided to it serves only to overcome the friction encountered during the course of rotation of the motor itself, whilst the shaft 6 of this latter turns substantially at the same speed as the shaft associated with the pulse generator 40.

Consequently, the odometer unit 13 driven by the drive shaft 6 via the kinematic chain 14 and the indicator unit 25 controlled by the magnet 9 provide an indication of the number of revolutions performed and, respectively, the speed of angular rotation of the shaft under control. A variation of this latter speed with respect to a set value involves a variation in the ratio between the presence and absence of supply to the motor 2 and, consequently, an adaptation of the angular speed of rotation of the motor 2 itself towards a new required value.

From a study of the chracteristics of the device formed according to the present invention the advantages which it allows to be obtained are evident.

First of all, there is obtained a considerable simplification in the assembly operations, essentially by the fact that electric motors are commercially available provided with a so called "tachometric" output and, that is to say, containing within them a magnet and a winding entirely similar to the magnet 31 and the winding 32 described above. Consequently, all the problems connected with the correct positioning of the transducer with respect to the magnet are overcome and it is readily possible to perform the whole of the assembly of the device by automatic machines without it being necessary to perform any subsequent manual checking. This also involves a discrete reduction in production costs without any reduction in the reliability of the device.

Finally, it is clear that the device 1 described above can have modifications and variations introduced thereto without departing from the present invention.

I claim:

1. A tachometric device, comprising:
    a first electrical signal generator for generating a first electrical signal dependent on the speed of rotation of a first shaft;
    an electric motor including a shaft;
    a magnetically controllable speed indicator unit;
    a first permanent magnet coupled for rotation with said motor shaft and magnetically cooperating with said speed indicator unit;
    a second electrical signal generator, integrally contained within said motor, for generating a second electrical signal dependent on the speed of rotation of said motor shaft, said second electrical signal generator comprising a second permanent magnet coupled for rotation with said motor shaft, an electric winding rigidly fixed to the body of said motor in a position substantially facing said second permanent magnet and providing said second electrical signal induced by the rotation of said second permanent magnet; and
    a processing circuit having a first and a second input connected to the outputs of said first and second electrical signal generators, respectively.

2. A device according to claim 1, wherein said second permanent magnet has a plurality of magnetic poles lying substantially in a plane perpendicular to the axis of said motor shaft.

3. A device according to claim 2, wherein said magnet poles and said electric winding are substantiallly coplanar.

4. A device according to claim 1, wherein said electric winding is provided with a plurality of circular turns lying substantially in a plane perpendicular to the axis of said motor shaft.

5. A device according to claim 1, wherein said second electrical signal generator includes a squaring circuit having an input connected to said electric winding and an output connected to the second input of said processing circuit.

* * * * *